United States Patent
Zhu et al.

(10) Patent No.: US 9,075,266 B2
(45) Date of Patent: Jul. 7, 2015

(54) DEVICE FOR PREBAKING ALIGNMENT FILM BY USING TEMPERATURE-CONTROLLABLE PIN TO SUPPORT SUBSTRATE AND METHOD THEREOF

(75) Inventors: Meina Zhu, Shenzhen (CN); Jianjun Zhao, Shenzhen (JP); Hsiangyin Shih, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 388 days.

(21) Appl. No.: 13/515,806

(22) PCT Filed: Apr. 25, 2012

(86) PCT No.: PCT/CN2012/074634
§ 371 (c)(1),
(2), (4) Date: Jun. 13, 2012

(87) PCT Pub. No.: WO2013/155729
PCT Pub. Date: Oct. 24, 2013

(65) Prior Publication Data
US 2013/0279889 A1 Oct. 24, 2013

(51) Int. Cl.
| | | |
|---|---|---|
| *F26B 3/30* | (2006.01) | |
| *F26B 19/00* | (2006.01) | |
| *G02F 1/1337* | (2006.01) | |
| *G02F 1/13* | (2006.01) | |

(52) U.S. Cl.
CPC .......... *G02F 1/13378* (2013.01); *G02F 1/1303* (2013.01)

(58) Field of Classification Search
None
See application file for complete search history.

(56) References Cited

U.S. PATENT DOCUMENTS

| | | | | |
|---|---|---|---|---|
| 5,907,246 | A * | 5/1999 | Abraham et al. | 324/750.08 |
| 7,393,207 | B2 * | 7/2008 | Imai | 432/259 |
| 7,638,003 | B2 * | 12/2009 | Satoh et al. | 118/728 |
| 2013/0067761 | A1 * | 3/2013 | Zhu | 34/237 |
| 2013/0271694 | A1 * | 10/2013 | Chang et al. | 349/58 |

* cited by examiner

*Primary Examiner* — Thor Campbell
(74) *Attorney, Agent, or Firm* — Cheng-Ju Chiang

(57) ABSTRACT

The present invention relates to a device for prebaking an alignment film by using a temperature-controllable pin to support a substrate and a method thereof. The device includes heater that prebakes a substrate from an underside of the substrate, a plurality of temperature-controllable pins for upward supporting the substrate, and a temperature control system. The temperature-controllable pins are coupled to the temperature control system and each of the temperature-controllable pins is independently controlled of temperature thereof by the temperature control system so as to uniformly heat a site of the substrate that is supported by the temperature-controllable pin and a periphery of the supported site. The device for prebaking alignment film by using temperature-controllable pin to support substrate and a method thereof according to the present invention alleviate non-uniform heating of a surface of glass substrate and thus alleviate pin mura.

9 Claims, 4 Drawing Sheets

DEVICE FOR PREBAKING ALIGNMENT FILM BY USING TEMPERATURE-CONTROLLABLE PIN TO SUPPORT SUBSTRATE AND METHOD THEREOF

BACKGROUND OF THE INVENTION

1. Field of the Invention

The present invention relates to the technology of prebaking of alignment film, and in particular to a device for prebaking an alignment film by using a temperature-controllable pin to support a substrate and a method thereof.

2. The Related Arts

Prebake of alignment film (also referred to as PI) is a process carried out after application of PI material to a substrate (by means of coating or inkjet printing) and before main cure to volatize solvent contained in the PI solution (which process volatilize 80% solvent). The primary constituent components of the PI solution are polyimide, N-methyl-s-pyrrolidone (NMP), and ethylene glycol butyl ether (BC). The purpose of prebake is to volatilize and remove the solvents, such as NMP and BC, from the PI solution in order to make the PI film flat and smooth. The primary measure adopted in this industry for prebaking of PI is heating a substrate with infrared radiation so as to cause volatilization of the solvent. Major process problems of such a baking technique include non-uniform heating and non-uniform volatilization in occurring in the baking process. The first problem is that contact of support pins with the substrate causes inconsistent heating between sites where contact is made and sites where no contact is made and this leads to "pin mura" caused by the pins. The second problem is that the volatilization speeds of solvent at a peripheral area and a central area are different and this leads to area of non-uniform film thickness, which is referred to as a "halo area" or "edge area". Consequently, product quality is affected.

The conventional process adopted in the industry is prebake plus proximity pin. As shown in FIG. 1, which schematically shows pin mura generated in the conventional process of prebake plus proximity, circular areas of a prebaked substrate 1 contain pin mura 10. The cause of the generation of the pin mura is that the proximity pins that support the substrate are generally not absolutely insulating. This causes inconsistent heating between the supported portions and the non-supported portion in the prebaking process and eventually affects the homogeneity of the volatilization of the PI solution on the surface of the substrate, leading to the pin mura formed on the surface of the substrate.

Conventionally, there are generally two measures that are adopted to alleviate pin mura. One is to improve the material of the pins by using material having better thermal insulation property, such as polyether ether ketone (KEEP), or a new substance polysalfone (PSF). The other is to improve the way of supporting of the proximity pins, which includes "lift pin" and "move pin". As shown in FIG. 2, which demonstrates the operation of the conventional way of supporting with "move pin", a substrate 2 is supported by movable pins 21 and fixed pins 22. The movable pins 21 are movable to change the positional status of the substrate 2, such as original point, ascending, advancing, descending, and reversing. As shown in FIG. 3, which demonstrates the operation of the conventional way of supporting with "lift pin", a substrate 3 is raised alternately by lift pins 31 and lift pins 32. The structures that can effect the operations of supporting illustrated in FIGS. 2 and 3 are known to those having ordinary skills in the art and thus detailed description is omitted herein. These operations, although to certain extents alleviating pin mura, yet are generally not possible to totally eliminate pin mura.

SUMMARY OF THE INVENTION

An object of the present invention is to provide a device for prebaking an alignment film by using a temperature-controllable pin to support a substrate that alleviates pin mura and improves quality of substrate.

Another object of the present invention is to provide a method for prebaking an alignment film by using a temperature-controllable pin to support a substrate that alleviates pin mura and improves quality of substrate.

To achieve the objects, the present invention provides a device for prebaking an alignment film by using a temperature-controllable pin to support a substrate, which comprises a heater that prebakes a substrate from an underside of the substrate, a plurality of temperature-controllable pins for upward supporting the substrate, and a temperature control system. The temperature-controllable pins are coupled to the temperature control system and each of the temperature-controllable pins is independently controlled of temperature thereof by the temperature control system so as to uniformly heat a site of the substrate that is supported by the temperature-controllable pin and a periphery of the supported site.

Wherein, the heater has a planar radiation surface that is parallel to a surface of the substrate for heating the substrate. The temperature-controllable pins vertically extend through the planar radiation surface.

Wherein, the substrate is a glass substrate.

Wherein, the temperature-controllable pins support the substrate in a move pin supporting fashion.

Wherein, the temperature-controllable pins support the substrate in a lift pin supporting fashion.

Wherein, the heater comprises an infrared radiation heater.

Wherein, the heater comprises a hot-airflow heater.

Wherein, the temperature-controllable pins comprise at least tips of which temperatures are controllable for upward supporting the substrate.

The present invention also provides a method for prebaking alignment film by using temperature-controllable pin to support substrate, comprising the following steps:

(1) providing a plurality of temperature-controllable pins to upward support a substrate;

(2) applying a heater to prebake the substrate from an underside of the substrate; and (3) applying a temperature control system to independently control temperature of each of the temperature-controllable pins in order to uniformly heat sites of the substrate that are supported by the temperature-controllable pins and peripheries of the supported sites.

Wherein, the heater has a planar radiation surface that is parallel to a surface of the substrate for heating the substrate. The temperature-controllable pins vertically extend through the planar radiation surface.

The device for prebaking alignment film by using temperature-controllable pin to support substrate and a method thereof according to the present invention alleviate non-uniform heating of a surface of glass substrate and thus alleviate pin mura.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

Figure 1:
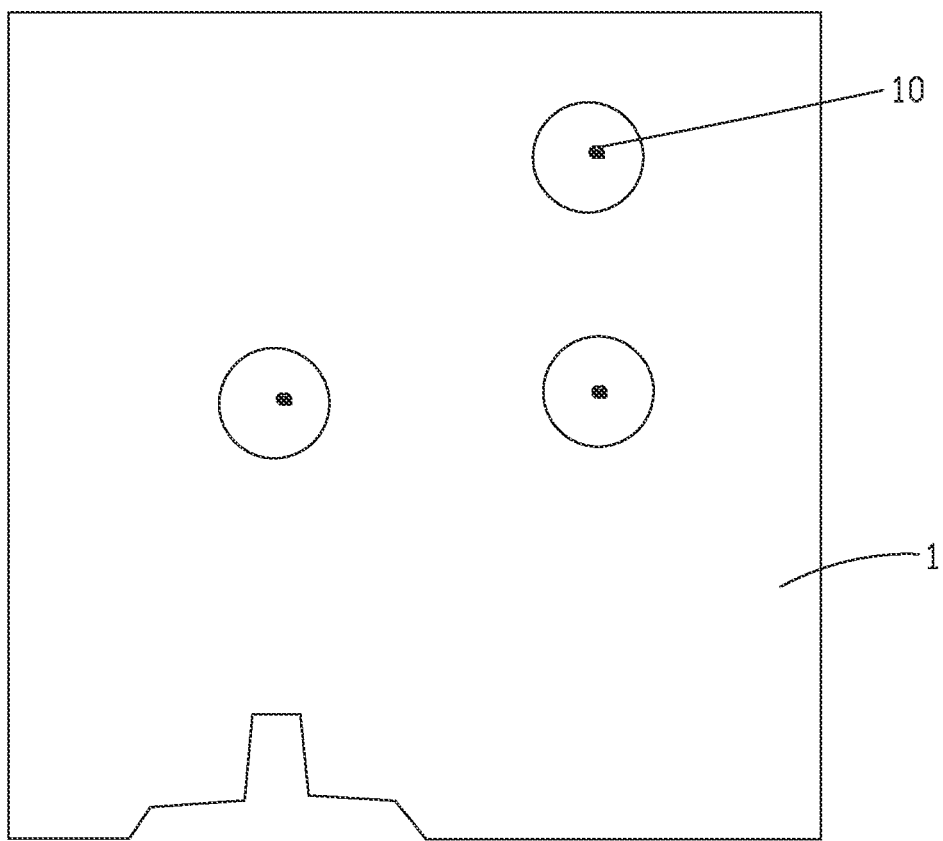
FIG. 1 schematically shows pin mura generated in a conventional process of prebake plus proximity.
Figure 2:
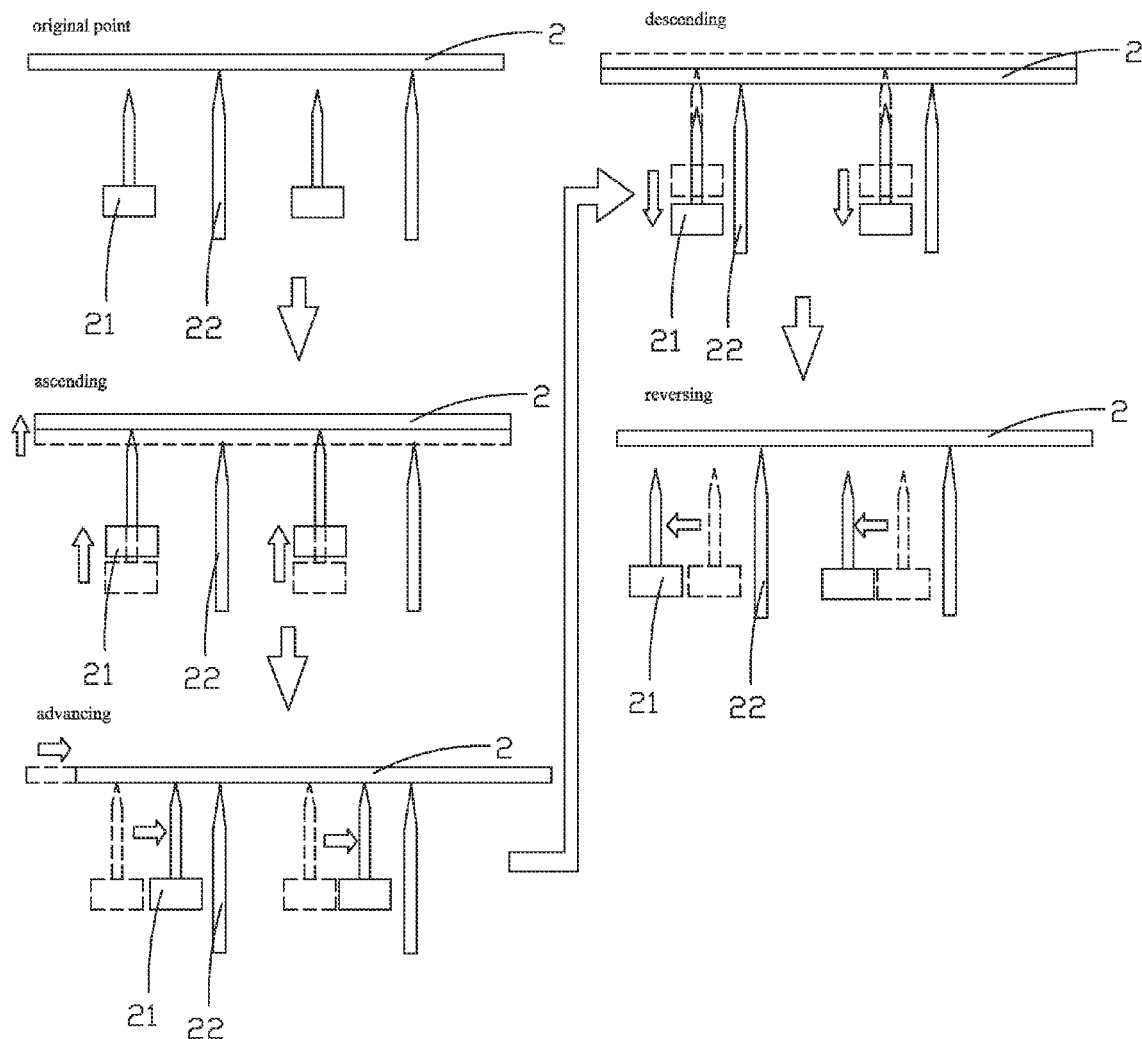
FIG. 2 demonstrates the operation of the conventional way of supporting with "move pin"
Figure 3:
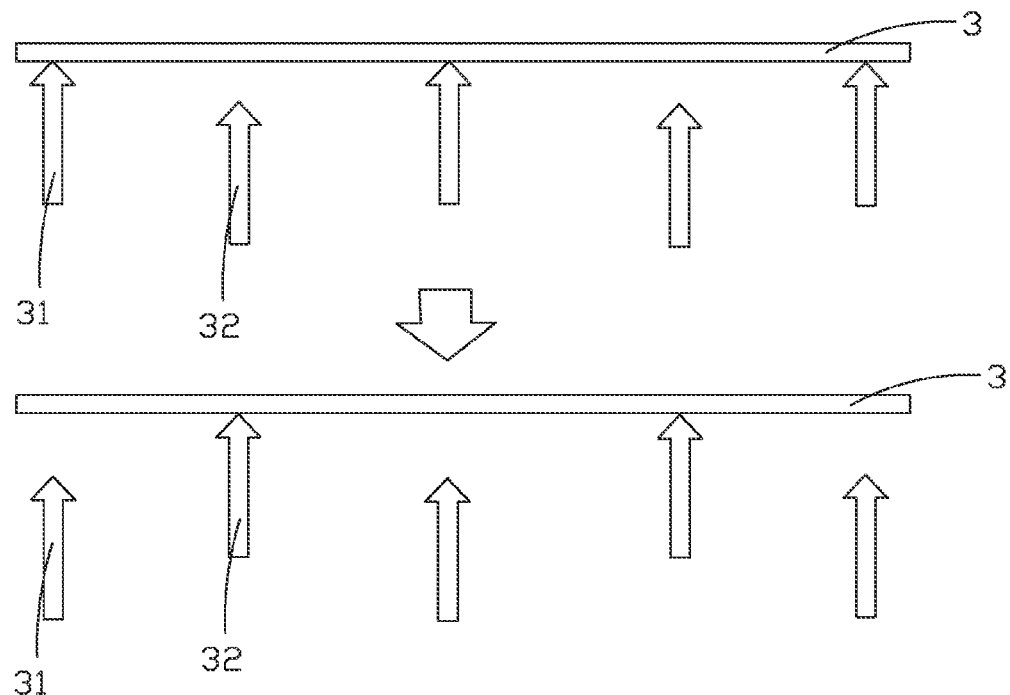
FIG. 3 demonstrates the operation of the conventional way of supporting with "lift pin"
Figure 4:
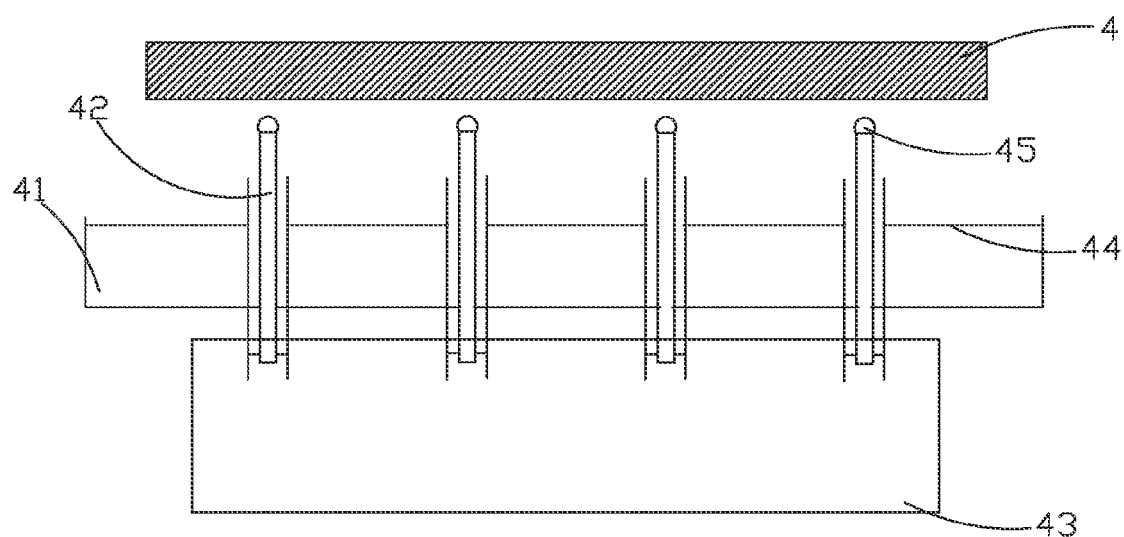
FIG. 4 is a schematic view illustrating a device for prebaking alignment film by using temperature-controllable pin to support substrate according to a preferred embodiment of the present invention.

Referring to FIG. 4, which is a schematic view illustrating a device for prebaking an alignment film by using a temperature-controllable pin to support a substrate according to a preferred embodiment of the present invention, the device for prebaking an alignment film by using a temperature-controllable pin to support a substrate according to the preferred embodiment comprises a heater 41 that prebakes a substrate 4 from an underside of the substrate 4, a plurality of temperature-controllable pins 42 for upward supporting the substrate 4, and a temperature control system 43. The temperature-controllable pins 42 are coupled to the temperature control system 43 and each of the temperature-controllable pins 42 is independently controlled of the temperature thereof by the temperature control system 43 so as to uniformly heat a site of the substrate 4 that is supported by the temperature-controllable pin 42 and a periphery of the supported site. To heat, the temperatures of the temperature-controllable pins 42 are properly regulated to achieve homogeneity of heating for both portions associated with the temperature-controllable pins 42 and portions where no temperature-controllable pins 42 are located, so as to alleviate or eliminate pin mura.

The heater 41 can be any known heating device used in the art, such as infrared radiation heater or hot-airflow heater, of which the source of heat can be resistance wires. In the preferred embodiment, the heater 41 has a planar radiation surface 44 that is parallel to a surface of the substrate 4 for heating the substrate 4. The temperature-controllable pins 42 vertically extend through the planar radiation surface 44. The substrate 4 can be a glass substrate. The present invention can be practiced in combination with the conventional proximity pin supporting operation to further alleviate pin mura. For example, the temperature-controllable pins 42 can be applied to support the substrate 4 in the same way as the "move pin" supporting, or alternatively, the temperature-controllable pins 42 can support the substrate 4 in the way of "lift pin" supporting.

Temperature control of the temperature-controllable pins 42 by the temperature control system 43 can be effected with a feedback control mechanism. For example, the temperature-controllable pins 42 are provided with temperature sensors to detect the temperatures of the supported sites of the substrate 4 and those of peripheries of the supported sites of the substrate 4. Based on result of comparison of temperature, the temperature control system 43 controls compensation of temperatures of the temperature-controllable pins 42. As to the actual structure of the temperature-controllable pin 42, besides the function and structure for supporting substrate as the conventional proximity pins, at least the temperature of tips 45 of the pins that upward support the substrate 4 is controllable.

Figure 5:
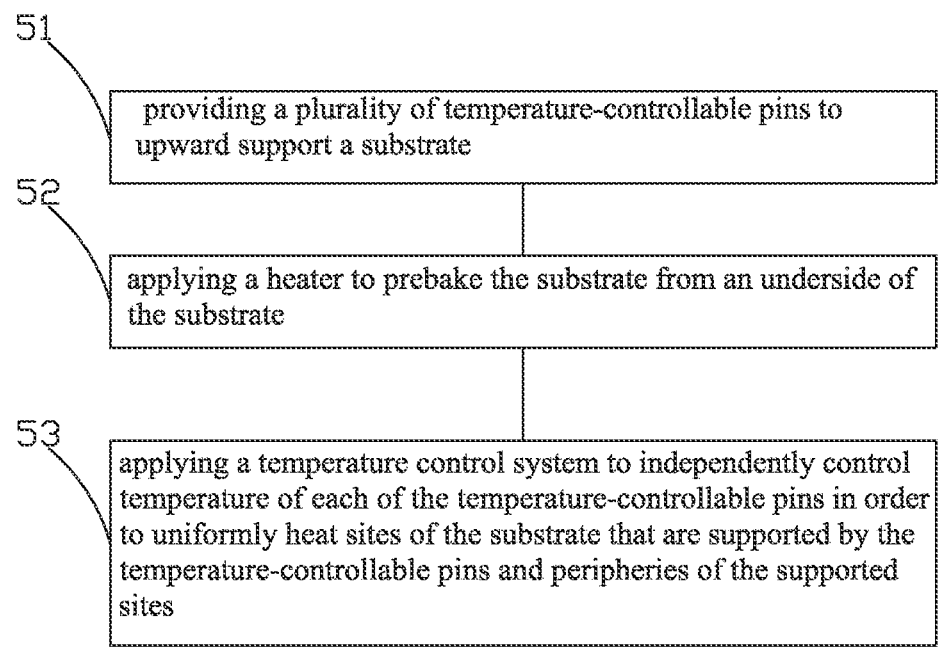
FIG. 5 is a flow chart illustrating a method for prebaking alignment film by using temperature-controllable pin to support substrate according to a preferred embodiment of the present invention.

Referring to FIG. 5, which is a flow chart illustrating a method for prebaking alignment film by using temperature-controllable pin to support substrate according to a preferred embodiment of the present invention, For the device for prebaking alignment film by using temperature-controllable pin to support substrate according to the present invention, the present invention further provides a corresponding method for is a flow chart illustrating a method for prebaking alignment film by using temperature-controllable pin to support substrate, which comprises the following steps:

Step 51: providing a plurality of temperature-controllable pins to upward support a substrate, wherein the method of the present invention is carried out on the basis of the conventional process of prebake plus proximity by using temperature-controllable pins of which temperatures are controllable to replace the proximity pins of the conventional process for supporting the substrate;

Step 52: applying a heater to prebake the substrate from an underside of the substrate;

Step 53: applying a temperature control system to independently control temperature of each of the temperature-controllable pins in order to uniformly heat sites of the substrate that are supported by the temperature-controllable pins and peripheries of the supported sites thereby achieving homogeneity of heating for both portions associated with the temperature-controllable pins and portions where no temperature-controllable pins are located, so as to alleviate or eliminate pin mura.

In summary, the present invention provides a device for prebaking alignment film by using temperature-controllable pin to support substrate and a method thereof, which allows each of the temperature-controllable pins to be independently controlled and, through the regulation of the temperatures of the temperature-controllable pins, uniform heating can be effected at peripheries of the pins to avoid the generation of pin mura caused by non-uniform heating.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A device for prebaking an alignment film by using a temperature-controllable pin to support a substrate comprising a heater that prebakes a substrate from an underside of the substrate, a plurality of temperature-controllable pins for upward supporting the substrate, and a temperature control system, the temperature-controllable pins being coupled to the temperature control system to be set at a heating temperature, each of the temperature-controllable pins being in contact with a portion of the underside of the substrate to apply the heating temperature to the portion of the underside of the substrate and comprising a temperature sensor mounted thereto to detect a temperature of the portion of the underside of the substrate, the detected temperature being transmitted to the temperature control system whereby the temperature control system controls compensation of the heating temperature of the temperature-controllable pin based on the detected temperature whereby the heating temperature of the temperature-controllable pin is individually and independently controlled by the temperature control system so as to individually heat the portion of the underside of the substrate that is supported by the temperature-controllable pin and a periphery of the supported portion of the underside of the substrate.

2. The device for prebaking an alignment film by using a temperature-controllable pin to support a substrate as claimed in claim 1, wherein the heater has a planar radiation surface that is parallel to a surface of the substrate for heating the substrate, the temperature-controllable pins vertically extending through the planar radiation surface.

3. The device for prebaking an alignment film by using a temperature-controllable pin to support a substrate as claimed in claim 1, wherein the substrate is a glass substrate.

4. The device for prebaking an alignment film by using a temperature-controllable pin to support a substrate as claimed in claim 1, wherein the temperature-controllable pins support the substrate in a move pin supporting fashion.

5. The device for prebaking an alignment film by using a temperature-controllable pin to support a substrate as claimed in claim 1, wherein the temperature-controllable pins support the substrate in a lift pin supporting fashion.

6. The device for prebaking an alignment film by using a temperature-controllable pin to support a substrate as claimed in claim 1, wherein the heater comprises an infrared radiation heater.

7. The device for prebaking an alignment film by using a temperature-controllable pin to support a substrate as claimed in claim 1, wherein the heater comprises a hot-airflow heater.

8. The device for prebaking an alignment film by using a temperature-controllable pin to support a substrate as claimed in claim 1, wherein the temperature-controllable pins comprise at least tips of which temperatures are controllable for upward supporting the substrate.

9. A device for prebaking an alignment film by using a temperature-controllable pin to support a substrate comprising a heater that prebakes a substrate from an underside of the substrate, a plurality of temperature-controllable pins for upward supporting the substrate, and a temperature control system, the temperature-controllable pins being coupled to the temperature control system to be set at a heating temperature, each of the temperature-controllable pins being in contact with a portion of the underside of the substrate to apply the heating temperature to the portion of the underside of the substrate and comprising a temperature sensor mounted thereto to detect a temperature of the portion of the underside of the substrate, the detected temperature being transmitted to the temperature control system whereby the temperature control system controls compensation of the heating temperature of the temperature-controllable pin based on the detected temperature whereby the heating temperature of the temperature-controllable pin is individually and independently controlled by the temperature control system so as to individually heat the portion of the underside of the substrate that is supported by the temperature-controllable pin and a periphery of the supported portion of the underside of the substrate;

wherein the heater has a planar radiation surface that is parallel to a surface of the substrate for heating the substrate, the temperature-controllable pins vertically extending through the planar radiation surface;

wherein the substrate is a glass substrate;

wherein the temperature-controllable pins support the substrate in a move pin supporting fashion;

wherein the heater comprises an infrared radiation heater; and wherein the temperature-controllable pins comprise at least tips of which temperatures are controllable for upward supporting the substrate.

\* \* \* \* \*